(12) United States Patent
Zimmerman et al.

(10) Patent No.: US 9,174,736 B2
(45) Date of Patent: Nov. 3, 2015

(54) AIR PASSENGER SEAT HAVING A FRAME

(71) Applicant: ZIM Flugsitz GmbH, Markdorf (DE)

(72) Inventors: Angelika Zimmerman, Markdorf (DE); Uwe Salzer, Friedrichshafen (DE)

(73) Assignee: Zim Flugsitz GmbH, Markdorf (DE)

( * ) Notice: Subject to any disclaimer, the term of this patent is extended or adjusted under 35 U.S.C. 154(b) by 0 days.

(21) Appl. No.: 14/244,965

(22) Filed: Apr. 4, 2014

(65) Prior Publication Data
US 2014/0300163 A1    Oct. 9, 2014

(30) Foreign Application Priority Data

Apr. 8, 2013   (DE) .......................... 10 2013 005 859

(51) Int. Cl.
*B60N 2/02*   (2006.01)
*B64D 11/06*   (2006.01)

(52) U.S. Cl.
CPC .............. *B64D 11/06* (2013.01); *B64D 11/064* (2014.12)

(58) Field of Classification Search
CPC .......... A47C 1/032; A47C 7/46; B64D 11/06; B64D 25/04
USPC ........................................ 297/284.4, 354.1
See application file for complete search history.

(56) References Cited

U.S. PATENT DOCUMENTS

| | | | |
|---|---|---|---|
| 4,526,421 A * | 7/1985 | Brennan et al. | 297/232 |
| 5,340,059 A * | 8/1994 | Kanigowski | 244/121 |
| 5,560,681 A * | 10/1996 | Dixon et al. | 297/284.11 |
| 5,961,073 A * | 10/1999 | Wittmann | 244/122 R |
| 2005/0012375 A1 * | 1/2005 | Giasson | 297/411.31 |
| 2007/0228790 A1 * | 10/2007 | Schurg et al. | 297/284.4 |
| 2010/0140999 A1 * | 6/2010 | Kladde | 297/284.4 |
| 2012/0104819 A1 | 5/2012 | Line et al. | |

FOREIGN PATENT DOCUMENTS

| | | | | |
|---|---|---|---|---|
| EP | 1 331 130 A1 | 7/2003 | | |
| EP | 1938713 A1 * | 7/2008 | ............... | B60N 2/22 |
| WO | WO 2007046177 A1 * | 4/2007 | | |
| WO | 2008/001071 A2 | 1/2008 | | |

OTHER PUBLICATIONS

German Search Report (Application No. 10 2013 005 859.7) dated Jan. 28, 2014.

* cited by examiner

*Primary Examiner* — Laurie Cranmer
(74) *Attorney, Agent, or Firm* — Burr & Brown, PLLC

(57) ABSTRACT

Proposed is an air passenger seat having a frame which is provided for attaching to a floor of an aircraft cabin and a backrest which is pivotably or securely mounted on the frame by means of a rotation spindle, wherein the seat has a seat reference point (SRP) which is defined according to the SAE International Aerospace Standard AS8049. According to the invention, the rotation spindle of the backrest has, in a line parallel to the cabin floor and as seen parallel to the direction of flight, a separation n of less than 40 mm from the seat reference point.

6 Claims, 2 Drawing Sheets

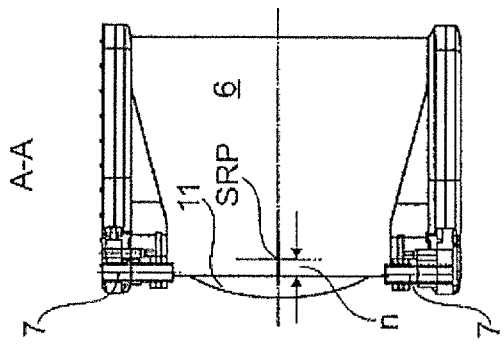
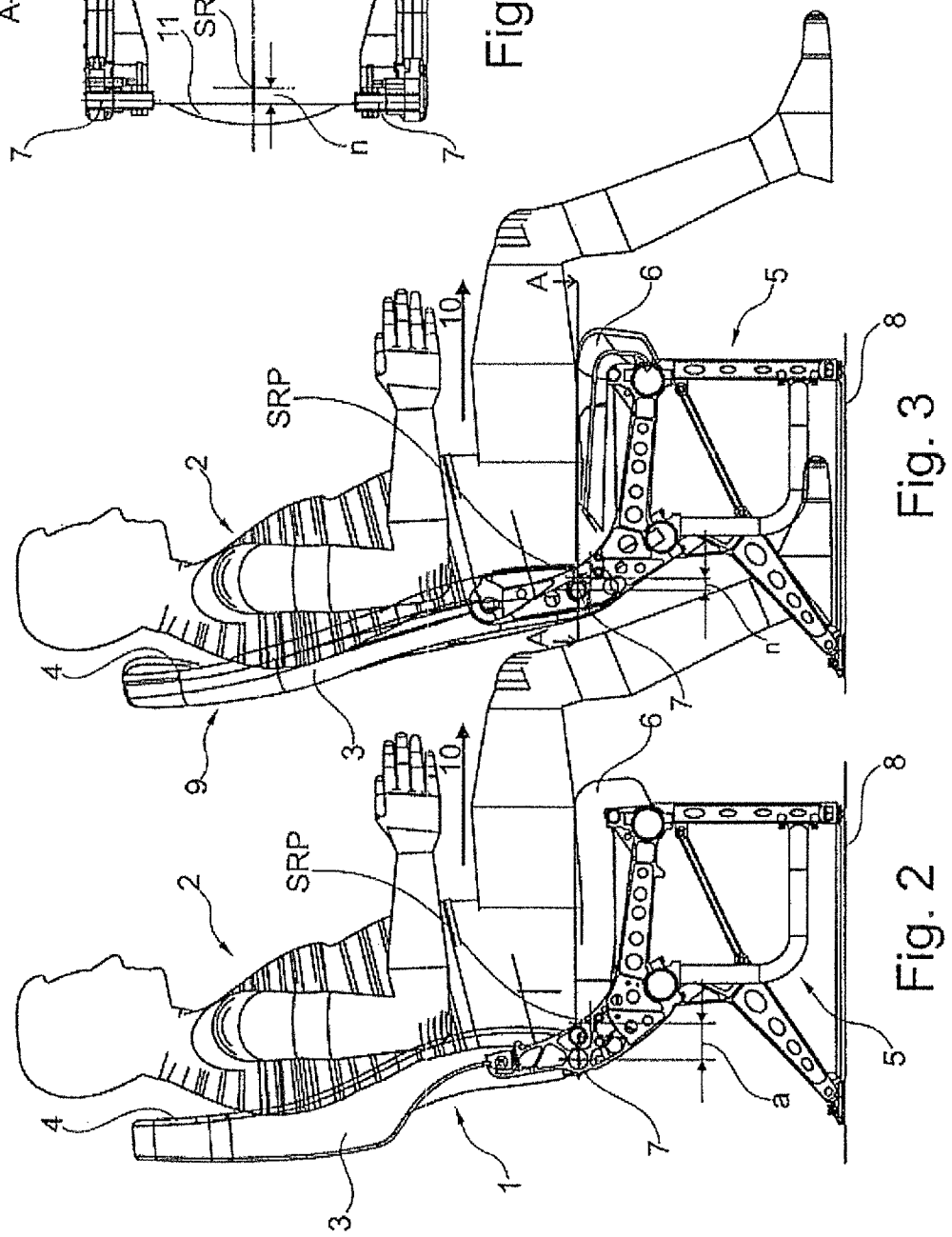

AIR PASSENGER SEAT HAVING A FRAME

CROSS REFERENCE TO RELATED APPLICATION

This application claims the benefit under 35 USC §119(a)-(d) of German Application No. 10 2013 005 859.7 filed Apr. 8, 2013.

FIELD OF THE INVENTION

The invention relates to an air passenger seat having a frame.

BACKGROUND OF THE INVENTION

Air passenger seats for aircraft are known in the most varied embodiments. An important aspect in the construction of air passenger seats is to allow the air passenger a large movement space for a given seat arrangement in an aircraft cabin.

SUMMARY OF THE INVENTION

The invention is based on the object of providing an air passenger seat which, for a given seat arrangement, allows an air passenger's movement space in relation to the subsequent air passenger seat to be increased.

The invention is based on an air passenger seat having a frame which is provided for attaching to a floor of an aircraft cabin and a backrest which is pivotably or securely mounted on the frame by means of a rotation spindle, wherein the seat has a seat reference point (SRP) which is defined according to the SAE International Aerospace Standard AS8049. Although the seat has a rotation spindle, it is possible for the backrest to be arranged securely on a frame, because those elements which are able to move in the pivotable case are stiffened. If these elements were again exchanged for movable elements, the backrest could then also be pivoted about this rotation spindle.

The heart of the invention now lies in the fact that the rotation spindle of the backrest has, in a line parallel to the cabin floor and as seen parallel to the direction of flight, a separation of less than 40 mm from the seat reference point (SRP). As a result of reducing the separation of the rotation spindle of the backrest from the seat reference point, the backrest takes on, as seen from above, a deeper curvature, such that an air passenger sits deeper in the seat, the position of the seat reference point being otherwise in particular unchanged. An air passenger thus has more space up to the seat in front and thus has greater freedom of movement. The seating feeling is more pleasant. On the other hand, it is possible, by means of this more compact construction of the air passenger seat, to install more air passenger seats in an aircraft cabin while maintaining an unchanged available space for an air passenger.

The central reference point is the seat reference point (SRP). The SRP is defined according to the SAE International Aerospace Standard AS8049.

The SRP is the point of intersection of the pressed-in cushion reference height CCD with the back tangent line of a seat which is loaded with a dummy person the weight of which is between 75 and 80 kg (see FIG. 1).

In FIG. 1, the back tangent line is given the reference sign BTL. A common method for determining the SRP is described below with reference to FIG. 1.

The method is called the "Pin method", or "Stiftmethode" in German, and has, in the abovementioned standard AS8049, the following seven steps:

(1) Seating a 75 to 80 kg test person or a fiftieth-percentile male anthropomorphic test dummy (ATD) on a seat as in FIG. 1.

(2) Locating and marking a point on the cushion which is directly below one ischial tuberosity (the BRP).

(3) Drilling a hole vertically through the seat shell cushioning and structure at this point and inserting a pin of length "A".

(4) Placing the test person or the dummy on the seat and measuring from a reference baseline to a lower end of the pin. The reference baseline is for example the floor baseline or the aircraft floor. This gives the height "B".

(5) Adding the height "B" and the length of the pin "A" gives the pressed-in cushion reference height "CCD" from the reference baseline.

(6) Inserting two round rods horizontally (also parallel with respect to the aircraft floor) between the back of the test person or of the test dummy and the seat back cushioning at a height of 90 mm and 420 mm vertically above the "CCD" and determining their position at a vertical reference height.

(7) Representing the two positions with the CCD and determining the SRP at the point of intersection thereof (see FIG. 1).

According to this definition of the SRP, it is preferred in one exemplary embodiment if, as seen in the direction of flight, the rotation spindle is in front of the SRP. It is thus possible to achieve a comparatively large space gain.

An advantageous space gain can also be achieved if, as seen in the direction of flight, the rotation spindle is behind the SRP.

It is also conceivable that the rotation spindle passes through the SRP.

A further possibility of the arrangement consists in that the rotation spindle is at the same height as the SRP.

In a furthermore preferred configuration of the invention, the bulge in the backrest on a plane of the seating surface from a side boundary to the deepest point is at least 20 mm. It is thus possible to reduce the separation between the SRP and the rotation spindle to less than 40 mm.

BRIEF DESCRIPTION OF THE DRAWINGS

Further advantages and features of the invention are described in more detail with reference to an exemplary embodiment of the invention according to the invention represented in the figures.

FIG. 2 shows an air passenger seat in a schematic side view known from the prior art having a schematically represented test person sitting thereon;

FIG. 3 shows a side view of an air passenger seat according to the invention having a schematically represented test person sitting thereon; and FIG. 4 is a view in section of the air passenger seat from FIG. 3 along the line of section A-A in FIG. 3.

DETAILED DESCRIPTION OF THE INVENTION

Figure 1:
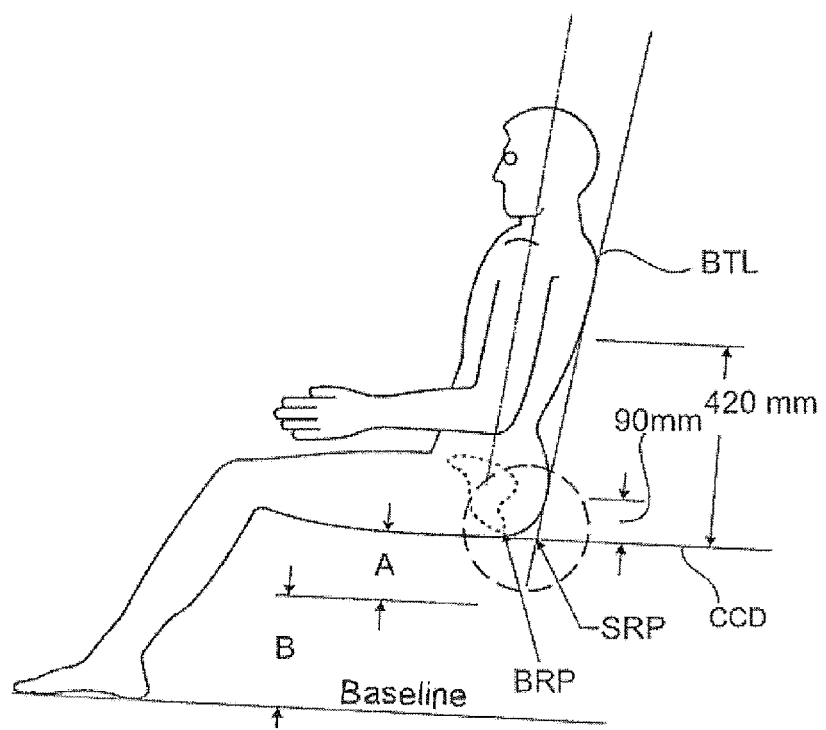
FIG. 1 is a schematic representation featuring a test person for illustrating the definition of the SRP from the standard SAE AS8049.

FIG. 2 shows an air passenger seat 1 known from the prior art having a test person 2 sitting thereon.

The air passenger seat 1 has a backrest 3 having a back cushion 4 and a seat frame 5 having a seat cushion 6.

The backrest 3 is connected to the seat frame by means of a rotation spindle 7. This is preferably the requisite rotation spindle for enabling a backrest support structure to be pivoted in relation to the seat frame.

The air passenger seat 1 further has an SRP which, in relation to an aircraft floor 8 as seen in the direction of flight 10, is at a separation a in front of the rotation spindle 7.

In the case of the seat according to the invention according to FIGS. 3 and 4, similar components are provided with identical reference signs.

A test person 2 is also seated on the air passenger seat 9 according to the invention.

The air passenger seat 9 has a backrest 3 having a back cushion 4 and a seat frame 5 having a seat cushion 6. The backrest is arranged on the seat frame 5 so as to be pivotable about the rotation spindle 7. The rotation spindle is also the requisite rotation spindle for pivoting a backrest support structure in relation to the seat frame. The structure of the air passenger seat 9, consisting of a backrest and a seat frame, is now matched to one another such that the rotation spindle 7 has a separation n from an SRP, which separation is less than the separation a of the seat from the prior art. This is again a separation oriented parallel to the aircraft cabin floor 8 and parallel to a direction of flight 10.

The separation a between the SRP and the rotation spindle 7 in the known configuration of an aircraft seat 1 is for example 60 mm. The separation according to the invention is less than 40 mm, 30 mm, 20 mm, 10 mm or 5 mm, or even less.

In FIGS. 3 and 4, the separation n is for example 21 mm.

Reducing the separation between the rotation spindle and the SRP, the SRP being unchanged, increases the curvature of the back cushion, which has the additional advantage that an air passenger also has more lateral support, as in a bucket-type seat.

The space gain in the present example is approximately 40 mm, which an air passenger can use up to the next seat. Increased available space, which is also referred to as "living space" in the aircraft, increases the wellbeing of an air passenger during the flight.

A smaller separation n between the rotation spindle 7 and the SRP also reduces moments on the backrest caused by an air passenger, whereby the backrest can be of a more lightweight overall construction.

FIG. 4 shows the rotation spindles 7 as seen from above and the SRP next to an indicated curvature 11 of the seat back cushion.

LIST OF REFERENCE SIGNS

1 Air passenger seat
2 Test person
3 Backrest
4 Back cushion
5 Seat frame
6 Seat cushion
7 Rotation spindle
8 Aircraft floor
9 Air passenger seat
10 Direction of flight
11 Curvature

The invention claimed is:

1. An air passenger seat having a frame which is provided for attaching to a floor of an aircraft cabin and a backrest which is pivotably mounted on the frame by means of a rotation spindle, wherein the seat has a seat reference point which is defined according to the SAE International Aerospace Standard AS8049, wherein the rotation spindle of the backrest has, in a line parallel to the cabin floor and parallel to the direction of flight, a separation of less than 40 mm from the seat reference point.

2. The air passenger seat according to claim 1, wherein, as seen in the direction of flight, the rotation spindle is in front of the seat reference point.

3. The air passenger seat according to claim 1, wherein, as seen in the direction of flight, the rotation spindle is behind the seat reference point.

4. The air passenger seat according to claim 1, wherein the rotation spindle passes through the seat reference point.

5. The air passenger seat according to claim 1, wherein the rotation spindle is at the same height as the seat reference point.

6. The air passenger seat according to claim 1, wherein a deepest point in the backrest curvature is on a plane of the seating surface that extends beyond a centerline of the rotation spindle by at least 20 mm.

* * * * *